UNITED STATES PATENT OFFICE.

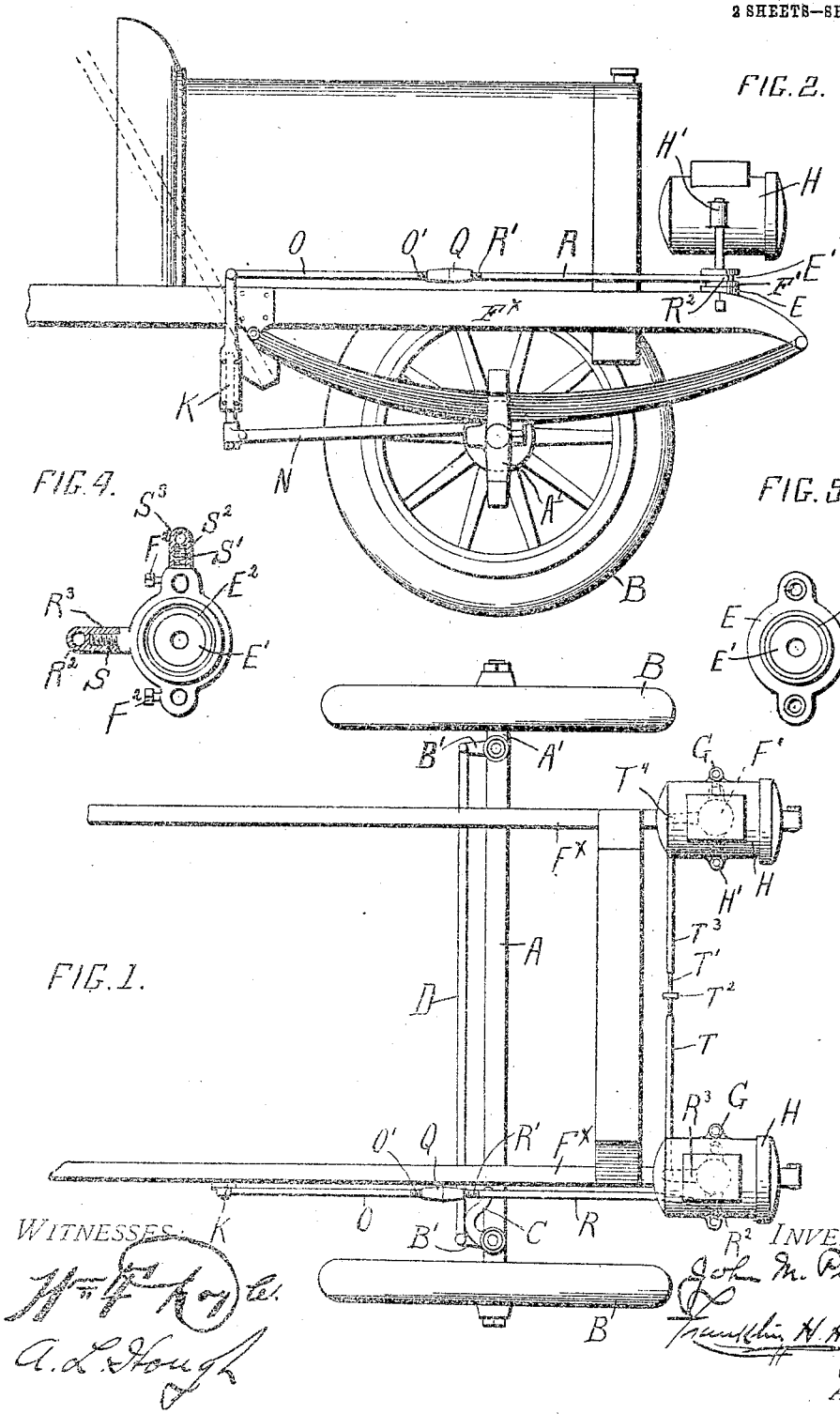

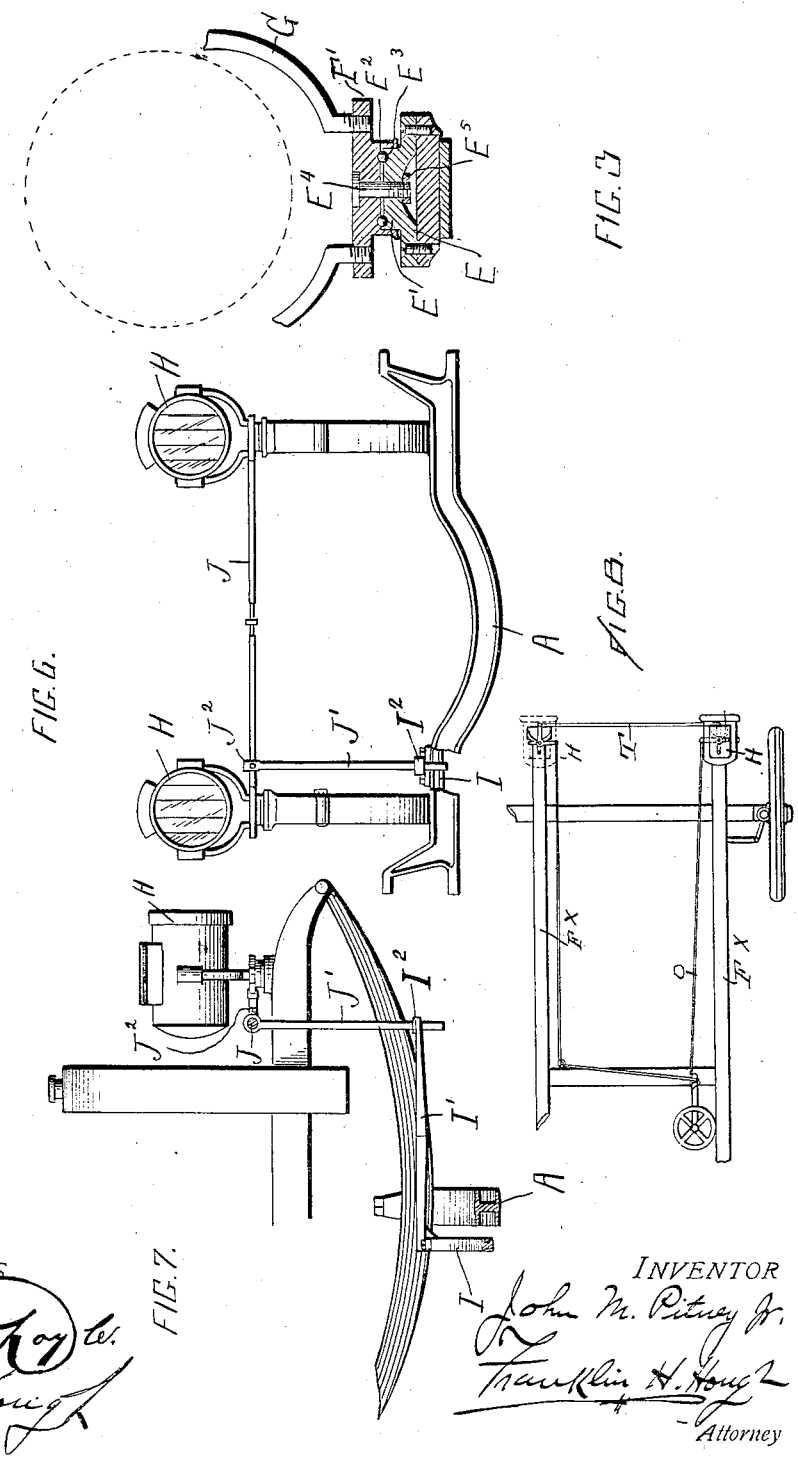

JOHN M. PITNEY, JR., OF LORAIN, OHIO.

CONTINUOUS-TRACK-LIGHT ATTACHMENT FOR AUTOMOBILES.

No. 923,295.

Specification of Letters Patent.

Patented June 1, 1909.

Application filed January 11, 1909. Serial No. 471,703.

*To all whom it may concern:*

Be it known that I, JOHN M. PITNEY, Jr., a citizen of the United States, residing at Lorain, in the county of Lorain and State of Ohio, have invented certain new and useful Improvements in Continuous - Track-Light Attachments for Automobiles; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to new and useful improvements in attachments for automobiles, consisting of means for automatically controlling the movements of the lamps and causing the rays therefrom to light the track to be traversed by the automobile.

The invention comprises various details of construction, combinations and arrangements of parts which will be hereinafter fully described and then specifically defined in the appended claims.

My invention is illustrated in the accompanying drawings, in which:—

Figure 1 is a top plan view showing the application of my invention to an automobile. Fig. 2 is a side elevation of a portion of the frame to an automobile showing the manner of attachment of the apparatus. Fig. 3 is an enlarged detail sectional view through the lamp support. Figs. 4 and 5 are detail views of the swivel turn table upon which the lamp is mounted, showing the adjustable connections therewith. Fig. 6 is a view showing a modified form of the apparatus as applied to the frame of an automobile, and Fig. 7 is an enlarged detail view of a portion of said modification. Fig. 8 is a slight modification of the means for operating the lamps.

Reference now being had to the details of the drawings by letter, A designates the drop axle of an automobile upon which the angled stub shafts A' are mounted and upon said stub axles the wheels B are journaled. Projecting from each of said stub axles is an arm B' connected by means of the wheel rocker rod D. Mounted upon the bars $F^x$ of the automobile are the plates E being bolted or otherwise fastened to the frame of the automobile and said plates form the supports for the turn tables F'. Each of said plates E has a raised portion E' with an annular groove $E^2$ formed in the upper surface thereof, forming a raceway for the ball bearings $E^3$. Said turn table F' is held upon the plate E by means of a bolt $E^4$ which is threaded to the plate E and passed through the turn table F', and a nut $E^5$ is mounted upon the lower threaded end of said bolt. The turn table F' is provided with threaded apertures in which bracket rods G engage, and set screws $F^2$ are mounted in threaded apertures, and designed to engage the threaded end of the bracket rods G. The lamps, designated by letter H, are mounted upon pivot pins H' upon the rods G in the usual manner.

A suitable lever of any desired shape and designated by letter K is fixed to the arm of the steering drive, as shown clearly in the side elevation of the drawings, and to one end of said lever is pivotally connected a bar N, which in turn is pivotally connected to an arm C fastened to or integral with one of said stub shafts. To the other end of the lever K a rod O is pivotally connected and Q is a turn buckle in which the threaded end O' of the rod O engages, and R is a rod having a threaded portion R' engaging the other end of said turn buckle and the forward end of the rod R is pivotally connected to an eye $R^2$ which is integral with the interiorly threaded shell $R^3$. Said turn table F has an integral threaded screw S adapted to engage the threads in the shell $R^3$ to allow for adjustment longitudinally of the rod connected thereto. Projecting from said turn table is a second integral rod, designated by letter S', and $S^2$ is a shell interiorly threaded and similar to the shell $R^3$ described and adapted to engage the threaded projection S'. An eye $S^3$ is formed at the end of the shell $S^2$ and is connected to a rod T having a hollow end interiorly threaded as at T' in which the adjustable thumb screw $T^2$ engages. $T^3$ is a rod similar to the rod T described and is pivotally connected to an eye at the end of the shell $T^4$ which in turn is fitted to a projection of a threaded shell similar to the shell $R^3$ upon the other lamp and the inner end of said rod $T^3$ has a hollow threaded portion also engaging the screw T'.

Referring to the modifications of my invention in Fig. 6 will be seen a rod J which is connected to the lamps in the same manner as before described and illustrated in the detail figures of the drawings but the operating means consist in a rod J' being fastened to one of the rods J by means of a T-connection J² and fastened to the rocker rod I is an angled bar I' having an elongated opening I² therein through which the rod J' passes and affords means for rocking the rod J' and through the medium of the rods J to cause the latter to move simultaneously with the movements of the wheel and in the same direction.

In Fig. 8 of the drawings, I have shown a slight modification of the means for turning the lamps in which cables O are connected to the steering shaft and also one to each of the lamps, as shown.

From the foregoing, it will be noted that, by the provision of the apparatus shown and described, means is afforded which may be easily and quickly adjusted to various makes of automobiles without injury thereto and so adjustably arranged as to throw the rays from the lights, upon the tracks to be traversed by the wheels of the automobile.

What I claim to be new is:—

1. In combination with the axle of an automobile, wheel carrying stub shafts pivoted thereto, rocker bar connections between said stub shafts, a steering bar connected to one of said stub shafts, plates adapted to be secured to the frame of the automobile, turn tables swivelly mounted upon said plates, a lamp secured to each turn table, said turn tables provided with integral screws, hollow threaded shells adjustably mounted upon said screws, connections between one of said shells and said steering bar, and adjustable connections between the turn tables, as set forth.

2. In combination with the axle of an automobile, wheel carrying stub shafts pivoted thereto, rocker bar connections between said stub shafts, a steering bar connected to one of said stub shafts, plates adapted to be secured to the frame of the automobile, turn tables swivelly mounted upon said plates, a lamp secured to each turn table, said turn tables provided with integral screws, hollow threaded shells adjustably mounted upon said screws, connections between one of said shells and said steering bar, rods pivotally connected to the shells upon said turn tables, the inner ends of said rods being hollow and threaded, and an adjustable thumb screw engaging the threads in the adjacent ends of said rods, as set forth.

In testimony whereof I hereunto affix my signature in the presence of two witnesses.

JOHN M. PITNEY, Jr.

Witnesses:
  LAURENCE H. JOB,
  CHARLES BOGARD.